US006885876B2

(12) United States Patent
Aaltonen et al.

(10) Patent No.: US 6,885,876 B2
(45) Date of Patent: Apr. 26, 2005

(54) MOBILE PHONE FEATURING AUDIO-MODULATED VIBROTACTILE MODULE

(75) Inventors: Olli Aaltonen, Turku (FI); Satu Jääskeläinen, Piispanristi (FI); Seppo Karjalainen, Turku (FI); Heikki Lang, Kurjala (FI); Heikki Hämäläinen, Turku (FI); Stina Ojala, Nousiainen (FI); Terho Kaikuranta, Piispanristi (FI)

(73) Assignee: Nokia Mobile Phones Ltd., Espoo (FI)

( * ) Notice: Subject to any disclaimer, the term of this patent is extended or adjusted under 35 U.S.C. 154(b) by 555 days.

(21) Appl. No.: 09/804,486

(22) Filed: Mar. 12, 2001

(65) Prior Publication Data

US 2002/0128048 A1 Sep. 12, 2002

(51) Int. Cl.[7] ............................................. H04M 1/00
(52) U.S. Cl. .................... 455/550.1; 455/567; 455/517; 340/566; 340/582
(58) Field of Search ............................. 455/550.1, 567, 455/517, 550; 340/566, 582

(56) References Cited

U.S. PATENT DOCUMENTS

| | | | | |
|---|---|---|---|---|
| 4,581,491 | A | * | 4/1986 | Boothroyd .................. 607/118 |
| 4,728,934 | A | | 3/1988 | Pfander et al. |
| 4,829,569 | A | * | 5/1989 | Seth-Smith et al. ........ 380/234 |
| 5,337,364 | A | | 8/1994 | Fitch |
| 5,857,986 | A | * | 1/1999 | Moriyasu ..................... 601/49 |
| 5,884,179 | A | * | 3/1999 | Patel .......................... 455/445 |
| 6,602,202 | B2 | * | 8/2003 | John et al. .................. 600/559 |
| 6,615,197 | B1 | * | 9/2003 | Chai ........................... 706/14 |

FOREIGN PATENT DOCUMENTS

| | | |
|---|---|---|
| DE | 3834442 C1 | 11/1989 |
| EP | 0 226 333 A1 | 6/1987 |

OTHER PUBLICATIONS

Ojala, Stina, "Vibrotactile Perception of Speech", Phonetics, Univ. of Turku, Finland.

Carney, Arlene Earley, Vibrotactile Perception of Segmental Features of Speech: A Comparison of Single–Channel and Multichannel Instruments, Journal of Speech and Hearing Research vol. 31, pp. 438–448, Sep. 1988.

Kirman, Jacob H., "Tactile Communication of Speech: A Review and an Analysis", Psychological Bulletin, vol. 80, No. 1, pp. 54–74.

(Continued)

*Primary Examiner*—Sonny Trinh
*Assistant Examiner*—Huy Phan
(74) *Attorney, Agent, or Firm*—Ware, Fressola, Van Der Sluys & Adolphson

(57) ABSTRACT

A telecommunications network includes a mobile phone with an audio-modulated vibrotactile module that responds to a telecommunications signal containing information about incoming speech from a called/calling party, for providing an audio-modulated vibrotactile module force containing information about the incoming speech from the called/calling party to vibrate a user's fingers, facial skin, wrist, cheek or other suitable location. The audio-modulated vibrotactile module has an audio-to-vibrotactile converter that responds to the telecommunications signal, for providing an audio-to-vibrotactile converter signal containing information about a vibration modulation of the incoming speech from the called/calling party. The audio-modulated vibrotactile module also has a vibrotactile actuator that responds to the audio-to-vibrotactile converter signal, for providing the audio-modulated vibrotactile module force in the form of a vibrotactile actuator force. The telecommunications system may also have the audio-to-vibrotactile converter. The vibrotactile actuator may be an electromechanical actuator arranged in the housing of the mobile phone for providing vibration to a user's fingers wrist or facial skin.

33 Claims, 4 Drawing Sheets

OTHER PUBLICATIONS

Levitt, Harry, "Signal Processing for Sensory Aids: A Unified View", American Journal of Otology, 1991, vol. 12, Supplement, pp. 52–55.

Sherrick, Carl E. et al., "The Localization of Low- and High-Frequency Vibrotactile Stimuli", J. Acoust. Soc. Am. 88 (1) (Jul. 1990), pp. 169–179.

Spens, Karl–Erik et al., "A Tactual "Hearing" Aid for the Deaf", STL–QPSF Jan. 1983, pp. 52–56.

Weisenberger, Janet M., et al., "Relative Performance of Single–Channel and Multichannel Tactile Aids for Speech Perception", Journal of Rehabilitation Research and Development, vol. 28 (2), 1991, pp. 45–56.

* cited by examiner

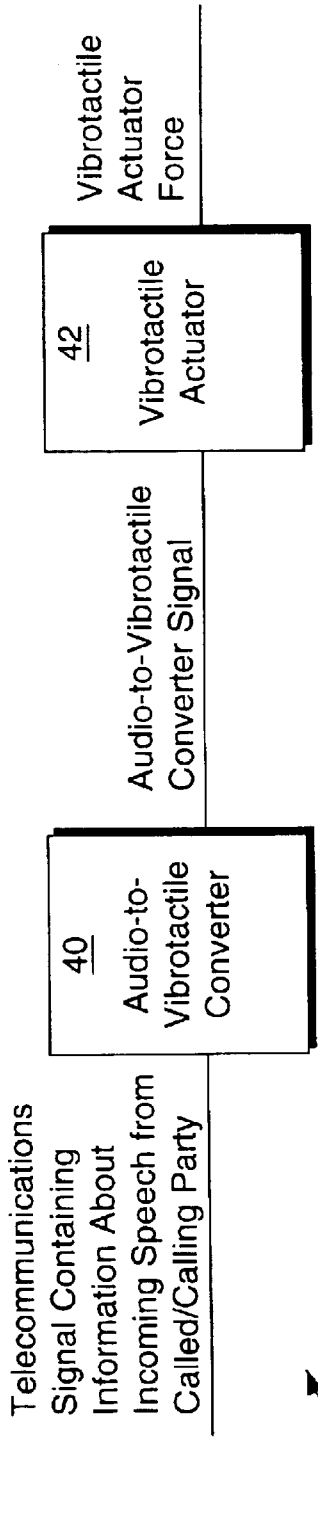
FIG. 2: Audio-Modulated Vibrotactile Module
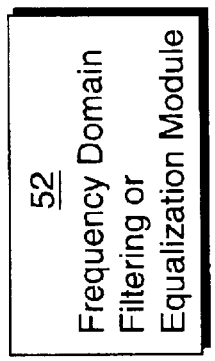
FIG. 4
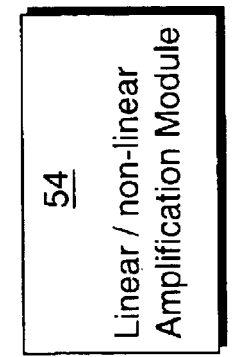
FIG. 5
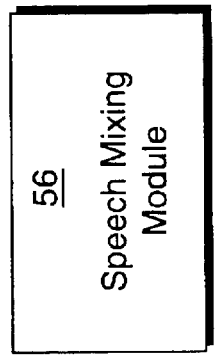
FIG. 6
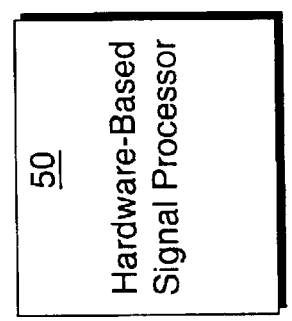
FIG. 3

FIG. 7
60
Software-Based Signal Processor

FIG. 8
62
Speech Encoding Algorithm Module

FIG. 9
70
Electro-Mechanical Actuator

FIG. 10
80
Acoustic Actuator

MOBILE PHONE FEATURING AUDIO-MODULATED VIBROTACTILE MODULE

BACKGROUND OF THE INVENTION

1. Field of Invention

The present invention relates to a telecommunications network; and, more particularly, to a mobile phone used therein.

2. Description of Related Art

Many people are either hard of hearing or cannot hear at all. These people have a very hard time using a mobile phone, or cannot use it at all.

In the prior art, there are only a few products that address this problem, including a hearing aid or a mobile phone loop headset. However, the hearing aids normally cannot be used with mobile phones. The NMP loop headset is one solution, but this requires that a significant amount of hearing capability still exists, and only the user's ears are used as an input channel.

Moreover, vibrotactile representation of speech stimuli is known in the art. In medical science, the vibrotactile-phenomenon is commonly practiced in audiology. See "Vibrotactile Perception of Speech," by Stina Ojala, Phonetics, University of Turku, Finland, for a full explanation of the vibrotactile phenomenon itself. Many different vibrotactile device are known, including devices mounted on an ear mould, a ring, a bracelet or a watch. These devices convert speech into a vibration modulation that stimulates and assists the user.

SUMMARY OF INVENTION

The present invention provides both a method and apparatus for assisting and improving hearing capability by feeding mechanical vibration to the fingers or other suitable location. This vibration is modulated by a received speech signal. This invention provides a way of applying the vibrotactile-phenomenon to use in mobile phones and a manner of implementing the same. The benefit of having this feature is to make hearing easier in case of reduced hearing capability or very loud background noise.

In its broadest sense, the present invention features a telecommunications network having a mobile phone with an audio-modulated vibrotactile module that responds to a telecommunications signal containing information about incoming speech from a called/calling party, for providing an audio-modulated vibrotactile module force containing information about the incoming speech from the called/calling party to vibrate a user's fingers, facial skin, wrist, cheek or other suitable location.

In one embodiment, the audio-modulated vibrotactile module comprises an audio-to-vibrotactile converter that responds to the telecommunications signal, for providing an audio-to-vibrotactile converter signal containing information about a vibration modulation of the incoming speech from the called/calling party. The audio-modulated vibrotactile module also has a vibrotactile actuator that responds to the audio-to-vibrotactile converter signal, for providing the audio-modulated vibrotactile module force in the form of a vibrotactile actuator force.

In another embodiment, the telecommunications system would comprise the audio-to-vibrotactile converter, and the audio-modulated vibrotactile module in the mobile phone would contain only the vibrotactile actuator.

The vibrotactile actuator may be an electromechanical actuator arranged in the housing of the mobile phone for providing vibration to a user's fingers, wrist or facial skin.

The present invention also includes a method comprising two steps, i.e. a converting step and a transforming step. First, a telecommunications signal containing information about incoming speech from a called/calling party is converted into an audio-to-vibrotactile converter signal containing information about a vibration modulation of the incoming speech from the called/calling party. Next, the audio-to-vibrotactile converter signal is transformed into an audio-modulated vibrotactile module force containing information about the incoming speech from the called/calling party to vibrate a user's fingers, facial skin, wrist, cheek or other suitable location.

The step of converting may include performing vibration modulation using frequency domain filtering or equalization, linear/non-linear amplification, mixing speech signals, or a speech encoding algorithm.

The step of transforming may include electromechanically or acoustically actuating the audio-modulated vibrotactile module force.

Implementation in a Mobile Phone

In particular, in the mobile phone an incoming voice information is used as a source for vibration modulation. Speech is fed directly or it can be modified by one or more known methods before it is sent to the transducer component that transforms electrical signals to mechanical vibration. The later modification can be done by hardware or by software, and it can perform a specific algorithm if so specified.

If a hardware approach is used, a relatively simple modification may be performed, such as frequency domain filtering or equalization, linear/non-linear amplification or mixing speech signal with other signal(s). A more complex modification may add considerable size, cost and component number within a device.

If a software approach is used, typically a calculation method or an algorithm can be used to modify the incoming speech signal. By using this signal as an input signal, a new output signal is determined according to the algorithm so that optimal vibration will be produced. An advantage of the software approach is that a known speech encoding algorithm can be utilized within the mobile phone to produce input parameters for the actual modification purpose for vibrotactile functionality. In the best case, only minor additions to the existing speech coding software would need to be made, and therefore the processing capacity requirement will not be significant, which makes this feature quite easy to include in existing phones from the software point of view. Another advantage is that, if needed, the vibration defining parameters can be adjusted by the user through a user interface, where the user may be the person him/herself, the doctor of the person, or where parameters such as either direct numerical parameters or a preset-list to select from may be used.

The electromechanical actuator may be any suitable component that is able to produce feasible vibration located within the product so that the optimal effect can be introduced. Vibration control signal is fed into this component, and a vibration is felt on the fingers, facial skin, wrist, cheek or other suitable locations.

The so-called F0-parameter (phonetic term, fundamental frequency) of the speech may be used for coding (signal modification), which helps one to interpret the incoming speech in a noisy environment. This makes it is possible to take into account the intonation and phonetic weight of the speech, which is an important property in some languages, such as Chinese, Vietnamese, etc., in which the tone and height of the voice is very important.

An acoustical transducer made to fit inside the user's ear could incorporate the vibrotactile feature or functionality, for example, such a transducer could easily be applied via the phone itself or another small device, such as audio transducer or accessory device.

Implementation in a Network

The audio-to-vibrotactile conversion processing may, in some cases, require so much processing power that it may be more feasible to implement this functionality in the telecommunications network. If a network-based solution is used, this feature will work with older phones as well and more processing power can be used. Also, a separately-priced network service can be provided to a specific customer. In this case, a phone subscriber will make a personal agreement with a network operator to use this kind of service, which is then utilized as associated with the specific telephone number in question. Network service can also utilize personalized hearing parameters adjusting the speech processing. These personal parameter(s) can be either selected by trial-error based, present values or personalized values given by a customer's physician.

BRIEF DESCRIPTION OF THE DRAWING

The drawing includes the following Figures:

FIG. 2 is a diagram of a vibrotactile module shown in FIG. 1 that is the subject matter of the present invention.

FIG. 3 is a diagram of a hardware-based signal processor that is part of an audio-to-vibrotactile converter shown in FIG. 2.

FIG. 4 is a diagram of a frequency domain filtering or equalization module that forms part of the hardware-based signal processor shown in FIG. 3.

FIG. 5 is a diagram of a linear/non-linear amplification module that forms part of the hardware-based signal processor shown in FIG. 3.

FIG. 6 is a diagram of a speech mixing module that forms part of the hardware-based signal processor shown in FIG. 3.

FIG. 7 is a diagram of a software-based signal processor that forms part of an audio-to-vibrotactile converter shown in FIG. 2.

FIG. 8 is a diagram of a speech encoding algorithm module that forms part of the software-based signal processor shown in FIG. 7.

FIG. 9 is a diagram of an electro-mechanical actuator that forms part of a vibrotactile actuator shown in FIG. 2.

FIG. 10 is a diagram of an acoustic actuator that forms part of a vibrotactile actuator shown in FIG. 2.

DETAILED DESCRIPTION OF INVENTION

Figure 1:
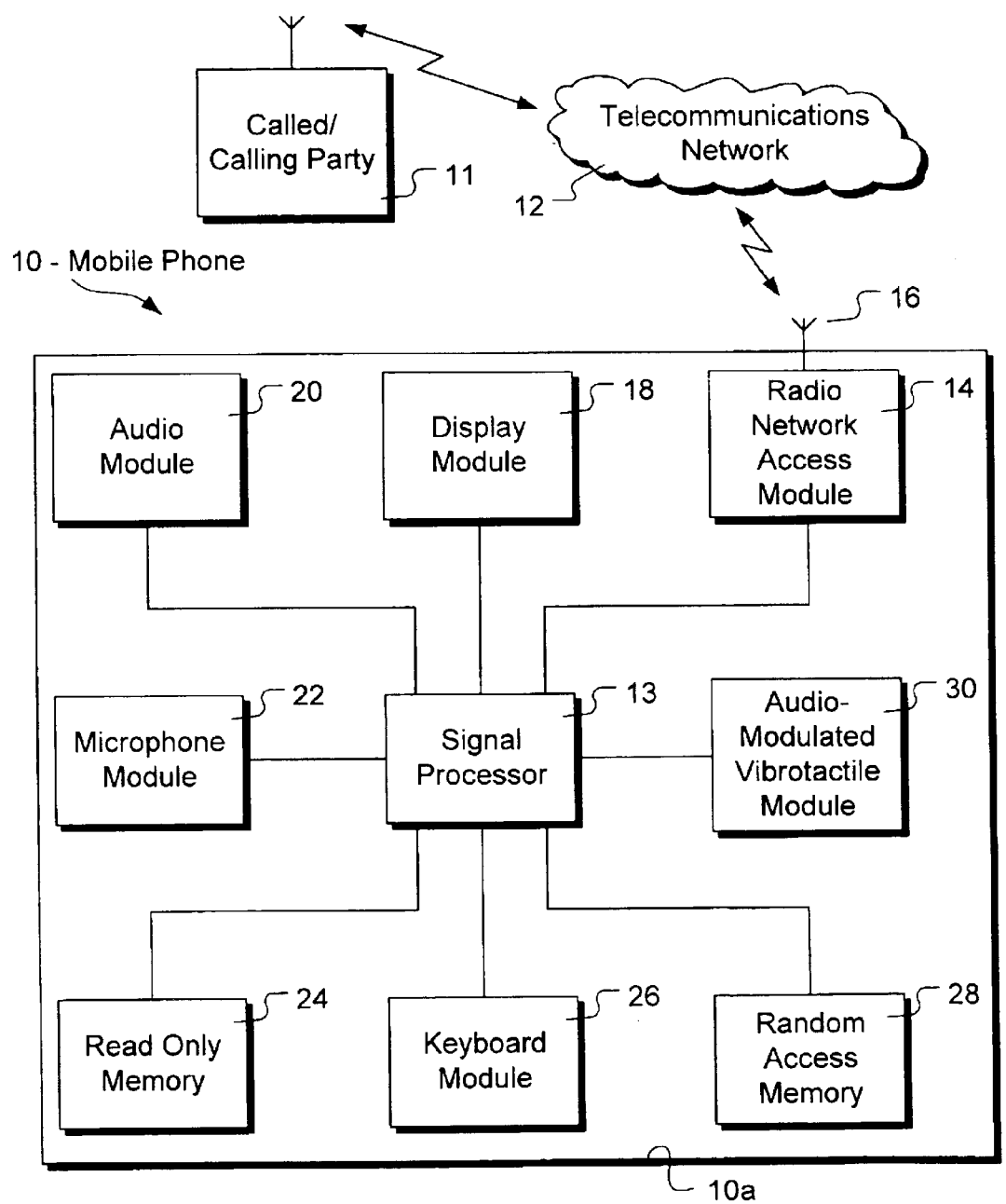
FIG. 1 is a diagram of one embodiment of a mobile phone in a telecommunications network that is the subject matter of the present invention.

FIG. 1: Mobile Phone

FIG. 1 shows a mobile phone generally indicated as 10 for use in connection with a telecommunication network generally indicated as 12. The scope of the invention is also intended to cover other user equipment and mobile electronic devices, such as a portable computer.

The mobile phone 10 includes a signal processor 13 connected to a radio access network module 14 having an antenna 16, a display module 18, an audio module 20, a microphone 22, a read only memory 24 (ROM or EPROM), a keyboard module 26 and a random access memory 28 (RAM), which are all known in the art. The operation of the signal processor 13 in relation to the aforementioned elements is also known in the art. Moreover, the scope of the invention is not intended to be limited to any particular kind or type of these elements. For example, the scope of the invention is intended to include the radio access network module 14 being an antenna module 14, a radio frequency (RF) module, a radio modem or the like.

The signal processor 13 is also connected to an audio-modulated vibrotactile module 30. The whole thrust of the invention relates to the operation of the audio-modulated vibrotactile module 30 with respect to the voice modulation of incoming speech into a vibrotactile sensation that can be sensed by the user of the mobile phone 10.

In operation, the audio-modulated vibrotactile module 30 responds to a telecommunications signal containing information about incoming speech from a called/calling party 11, and provides an audio-modulated vibrotactile module force containing information about the incoming speech from the called/calling party 11 to vibrate a user's fingers, facial skin, wrist, cheek or other suitable location.

As discussed below, the audio-to-vibrotactile conversion may be performed in the mobile phone 10 as shown in FIG. 1 or in the telecommunications network as shown and described below in relation to FIG. 11.

FIG. 2: Audio-Modulated Vibrotactile Module

FIG. 2 shows in detail the audio-modulated vibrotactile module 30 having an audio-to-vibrotactile converter 40 and a vibrotactile actuator 42.

In operation, the audio-to-vibrotactile converter 40 responds to the aforementioned telecommunications signal, and provides an audio-to-vibrotactile converter signal containing information about a vibration modulation of the incoming speech from the called/calling party 11.

The vibrotactile actuator 42 responds to the audio-to-vibrotactile converter signal, and provides the audio-modulated vibrotactile module force in the form of a vibrotactile actuator force that contains the information about the incoming speech from the called/calling party 11 to vibrate a user's fingers, facial skin, wrist, cheek or other suitable location.

The audio-to-vibrotactile converter 40 may be implemented in hardware or software, as discussed below. The scope of the invention is not intended to be limited to any particular implementation thereof.

The vibrotactile actuator 42 may be an electromechanical actuator 70 (FIG. 9) arranged in a housing generally indicated in FIG. 1 as 10a of the mobile phone 10 (FIG. 1) for providing a vibration to a user's fingers, wrist or facial skin. Vibrotactile actuators are known in the art, and the scope of the invention is not intended to be limited to any particular type or kind thereof.

FIGS. 3–6: Hardware-Based Vibration Modulation

FIG. 3 shows a hardware-based signal processor 50 for performing a vibration modulation in the audio-tovibrotactile converter 40. In the hardware-based signal processor 50, the vibration modulation may be performed using a frequency domain filtering or equalization module 52 shown in FIG. 4, a linear/non-linear amplification module 54 shown in FIG. 5, or a speech mixing module 56 shown in FIG. 6 for mixing speech signals with other signals.

The hardware-based signal processor 50 may be implemented to perform any one of the aforementioned functions using a microcontroller-based design. As a person skilled in the art would appreciate, the microcontroller-based design would typically include an inexpensive microcontroller, ROM, RAM, input/output devices and data and address lines for coupling the same. The scope of the invention is not intended to be limited to any particular hardware implementation of the signal processor 50.

FIGS. 7–8: Software-Based Vibration Modulation

FIG. 7 shows a software-based signal processor 60 for performing vibration modulation in the audio-to-vibrotactile converter 40.

In the software-based signal processor 60, the vibration modulation may be performed using a speech encoding algorithm module 62 shown in FIG. 8.

The software-based signal processor 60 may be implemented to perform any one of the speech encoded algorithm using a microprocessor-based design. As a person skilled in the art would appreciate, the microprocessor-based design would typically include a more expensive processor, ROM, RAM, input/output and data and address lines for coupling the same. The scope of the invention is not intended to be limited to any particular software implementation of the signal processor 60.

Moreover, the software-based signal processor 60 may respond to user adjustable vibration defining parameters received from the user of the mobile phone 10 (FIG. 1), including direct numerical parameters or a pre-set list of parameters, as discussed above.

FIGS. 9–10: Vibrotactile Actuator

The vibrotactile actuator 42 (FIG. 2) may be suitably arranged in different portions of the housing 10a (FIG. 1) for providing different vibrations on the different portions of the user of the mobile phone (FIG. 1).

For example, the electromechanical actuator 70 shown in FIG. 9 may be suitably arranged as follows:

(1) in a lower portion of a housing 10a of the mobile phone 10 for providing vibration on the user's fingers,
(2) in a lower or intermediate portion of a housing 10a of the mobile phone 10 for providing vibration on the user's facial skin,
(3) in a lower or intermediate portion of a housing 10a of the mobile phone 10 for providing vibration on the user's wrist, or
(4) in an intermediate portion of a housing 10a of the mobile phone 10 for providing vibration on the user's cheek.

The scope of the invention is not intended to be limited to the arrangement of the vibrotactile actuator 42 (FIG. 2) in the housing 10a of the mobile phone 10.

Moreover, the vibrotactile actuator 42 (FIG. 2) may also be an acoustic actuator 80 shown in FIG. 10 suitably sized for fitting into a user's ear.

Figure 11:
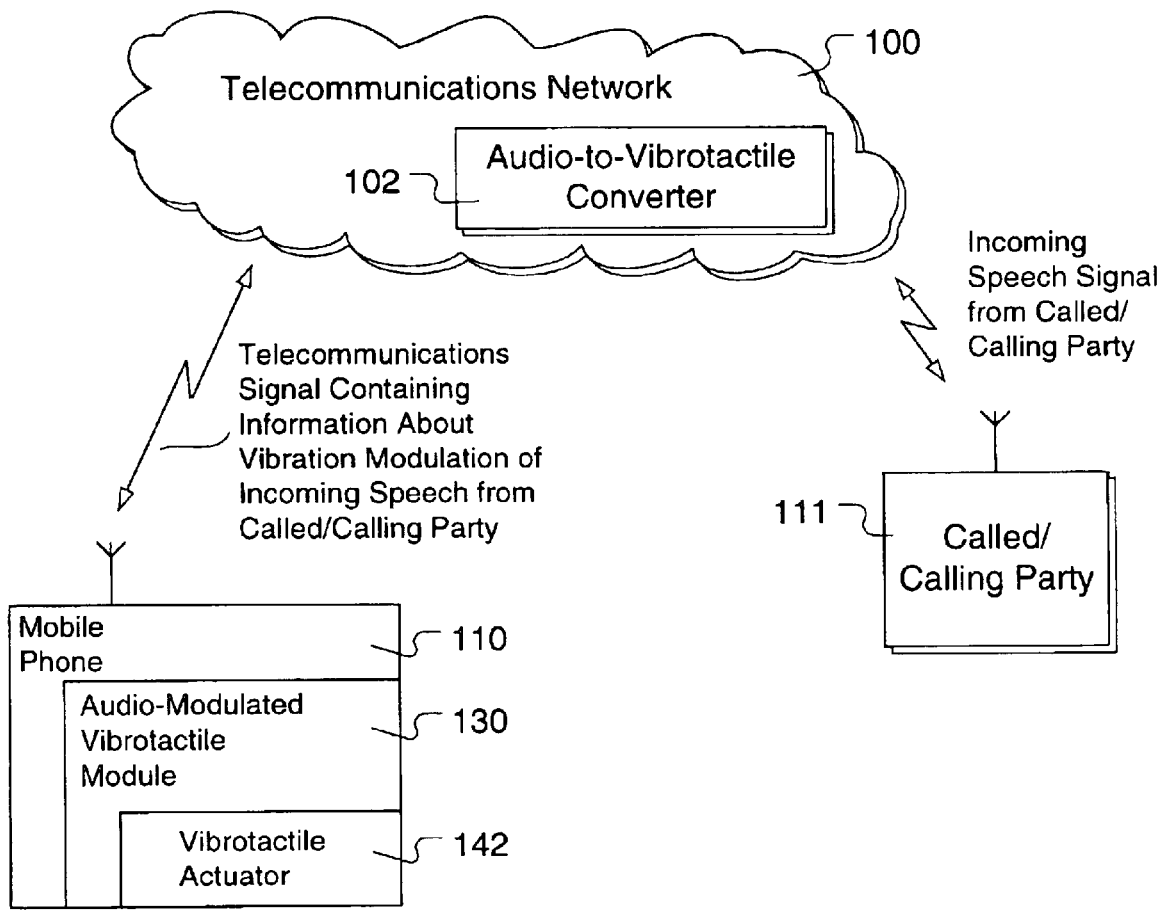
FIG. 11 is a diagram of another embodiment of a mobile phone in a telecommunications network that is the subject matter of the present invention.

FIG. 11: Telecommunications Network 100

FIG. 11 shows another embodiment of the present invention, wherein the telecommunications system generally indicated as 100 comprises an audio-to-vibrotactile converter 102. Consistent with that discussed above, the audio-to-vibrotactile converter 102 may be implemented in hardware or software, and the scope of the invention is not intended to be limited to any particular implementation thereof.

In operation, the audio-to-vibrotactile converter 102 responds to an incoming speech signal from a called/calling party 111, for providing the telecommunications signal in the form of an audio-to-vibrotactile converter signal containing information about a vibration modulation of the incoming speech from the called/calling party 111.

In this embodiment, the mobile phone 110 has an audio-modulated vibrotactile module 130 that only includes a vibrotactile actuator 142. The vibrotactile actuator 142 responds to the audio-to-vibrotactile converter signal from the audio-to-vibrotactile converter 102, for providing the audio-modulated vibrotactile module force in the form of a vibrotactile actuator force.

The telecommunications network 100 may be a separately-priced vibrotactile service network.

Figure 12:
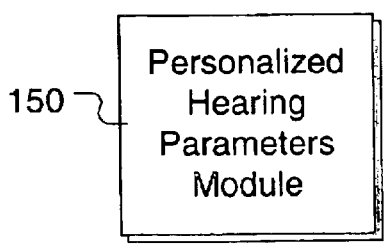
FIG. 12 is a diagram of a personalized hearing parameters module of an audio-to-vibrotactile converter shown in FIG. 11.

The audio-to-vibrotactile converter 102 may include a personalized hearing parameters module 150 shown in FIG. 12 for adjusting speech processing so a user of the mobile phone can have personalized hearing parameters. The personalized hearing parameters can either be selected by a trial-and-error basis, preset values or personalized values given by a user's physician, for example.

Advantages of the Invention

Some advantages of the invention include the following:

1) New hearing aid devices can be made available.
2) The user's ears will not be the only channel to distribute speech for listening.
3) People having significant hearing loss can use mobile phones easier than before (if previously at all possible). The invention will also help hearing in a noisy environment where there is typically reduced hearing capability.
4) 
5) The invention may be implemented with only minor hardware/software modification, which is primarily related to use of the mechanical vibration component.
6) The invention has potential for integration with other audio enhancement features, for example, such as with active background noise reduction by shifting pitch as related to background noise level to assist hearing with all other users as well.
7) If a hearing loss will prevent someone from having conversations, they still are able to communicate with other people with the help of a mobile phone having this feature. This feature has the potential even to turn a phone into a hearing aid, leading to frequent and required every day use of the device.
8) If a network-based solution is used, this feature will work with older phones as well and more processing power can be used. Also, a separately priced network service can be provided to a specific customer.
9) Finally, some improvement of hearing capability can also be expected in a noisy environment with normal hearing ability as well.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

We claim:

1. A telecommunications network having a mobile phone, characterized in that
the mobile phone comprises an audio-modulated vibrotactile module that responds to a telecommunications signal containing information about incoming speech from a called/calling party, for providing an audio-modulated vibrotactile module force containing information about the incoming speech from the called/calling party to vibrate a user's fingers, facial skin, wrist, cheek or other suitable location.

2. A telecommunications network according to claim 1, characterized in that
the audio-modulated vibrotactile module comprises an audio-to-vibrotactile converter that responds to the telecommunications signal, for providing an audio-to-vibrotactile converter signal containing information about a vibration modulation of the incoming speech from the called/calling party.

3. A telecommunications network according to claim 2, characterized in that
the audio-modulated vibrotactile module comprises a vibrotactile actuator that responds to the audio-to-vibrotactile converter signal, for providing the audio-modulated vibrotactile module force in the form of a vibrotactile actuator force.

4. A telecommunications network according to claim 3, characterized in that the telecommunications network includes a separately-priced vibrotactile service network.

5. A telecommunications network according to claim 3, characterized in that the audio-to-vibrotactile converter includes a personalized hearing parameters module for adjusting speech processing so a user can have personalized hearing parameters.

6. A telecommunications network according to claim 5, characterized in that the personalized hearing parameters can either be selected by a trial-and-error basis, preset values or personalized values given by a user's physician.

7. A telecommunications network according to claim 3, characterized in that the vibrotactile actuator is an electro-mechanical actuator.

8. A telecommunications network according to claim 3, characterized in that the vibrotactile actuator is suitably arranged in a housing of the mobile phone for providing vibration on the user's fingers.

9. A telecommunications network according to claim 3, characterized in that the vibrotactile actuator is suitably arranged in a housing of the mobile phone for providing vibration on the user's facial skin.

10. A telecommunications network according to claim 3, characterized in that the vibrotactile actuator is suitably arranged in a housing of the mobile phone for providing vibration on the user's wrist.

11. A telecommunications network according to claim 3, characterized in that the vibrotactile actuator is suitably arranged in a housing of the mobile phone for providing vibration on the user's cheek.

12. A telecommunications network according to claim 3, characterized in that the vibrotactile actuator is an acoustic actuator suitably sized for fitting into a user's ear.

13. A telecommunications network according to claim 1, characterized in that
the telecommunications system comprises an audio-to-vibrotactile converter that responds to an incoming audio signal containing the incoming speech from the called/calling party, for providing the telecommunications signal in the form of an audio-to-vibrotactile converter signal containing information about a vibration modulation of the incoming speech from the called/calling party.

14. A telecommunications network according to claim 13, characterized in that
the audio-modulated vibrotactile module comprises a vibrotactile actuator that responds to the audio-to-vibrotactile converter signal, for providing the audio-modulated vibrotactile module force in the form of a vibrotactile actuator force.

15. A telecommunications network according to claim 13, characterized in that the telecommunications signal contains information about the incoming speech that is a source for vibration modulation.

16. A telecommunications network according to claim 1, characterized in that the audio-to-vibrotactile converter includes a hardware-based signal processor for performing a vibration modulation.

17. A telecommunications network according to claim 16, characterized in that the vibration modulation includes frequency domain filtering or equalization.

18. A telecommunications network according to claim 16, characterized in that the vibration modulation includes linear/non-linear amplification.

19. A telecommunications network according to claim 16, characterized in that the vibration modulation includes mixing speech signals with other signals.

20. A telecommunications network according to claim 1, characterized in that the audio-to-vibrotactile converter includes a software-based signal processor for performing vibration modulation.

21. A telecommunications network according to claim 20, characterized in that the vibration modulation includes using a speech encoding algorithm.

22. A telecommunications network according to claim 20, characterized in that the software-based signal processor responds to user adjustable vibration defining parameters.

23. A telecommunications network according to claim 22, characterized in that the user adjustable vibration defining parameters include direct numerical parameters.

24. A telecommunications network according to claim 22, characterized in that the user adjustable vibration defining parameters include a pre-set list of parameters.

25. A telecommunications network according to claim 1, characterized in that the telecommunications network uses an F0-format for speech encoding to assist in interpreting incoming speech in noisy environments.

26. A mobile phone comprising:
an audio-modulated vibrotactile module that responds to a telecommunications signal containing information about incoming speech from a called/calling party, for providing an audio-modulated vibrotactile module force containing information about the incoming speech from the called/calling party to vibrate a user's fingers, facial skin, wrist, cheek or other suitable location;
the audio-modulated vibrotactile module having an audio-to-vibrotactile converter that responds to the telecommunications signal, for providing an audio-to-vibrotactile converter signal containing information about a vibration modulation of the incoming speech from the called/calling party; and the audio-modulated vibrotactile module also having a vibrotactile actuator that responds to the audio-to-vibrotactile converter signal, for providing the audio-modulated vibrotactile module force in the form of a vibrotactile actuator force.

27. A method according to claim 26, characterized in that the step of transforming includes electromechanically actuating the audio-modulated vibrotactile module force.

28. A method according to claim 26, characterized in that the step of transforming includes acoustically actuating the audio-modulated vibrotactile module force.

29. A method comprising the steps of:

converting a telecommunications signal containing information about incoming speech from a called/calling party into an audio-to-vibrotactile converter signal containing information about a vibration modulation of the incoming speech from the called/calling party; and transforming the audio-to-vibrotactile converter signal into an audio-modulated vibrotactile module force containing information about the incoming speech from the called/calling party to vibrate a user's fingers, facial skin, wrist, cheek or other suitable location.

30. A method according to claim 29, characterized in that the step of converting includes performing vibration modulation using frequency domain filtering or equalization.

31. A method according to claim 29, characterized in that the step of converting includes performing vibration modulation using linear/non-linear amplification.

32. A method according to claim 29, characterized in that the step of converting includes performing vibration modulation using mixing speech signals with other signals.

33. A method according to claim 29, characterized in that the step of converting includes performing vibration modulation using a speech encoding algorithm.

* * * * *